(12) United States Patent
Peel et al.

(10) Patent No.: US 10,443,751 B2
(45) Date of Patent: *Oct. 15, 2019

(54) VALVE WITH FAIL-SAFE DEVICE

(71) Applicant: KOHLER MIRA LIMITED, Cheltenham, Gloucestershire (GB)

(72) Inventors: Kevin T. Peel, Gloucester (GB); Sean P. Conway, Cranham (GB)

(73) Assignee: KOHLER MIRA LIMITED (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,678

(22) Filed: Apr. 17, 2017

(65) Prior Publication Data

US 2017/0219114 A1    Aug. 3, 2017

Related U.S. Application Data

(60) Division of application No. 14/878,788, filed on Oct. 8, 2015, now Pat. No. 9,644,757, which is a
(Continued)

(51) Int. Cl.
*F16K 17/36* (2006.01)
*F16K 31/10* (2006.01)
(Continued)

(52) U.S. Cl.
CPC .............. *F16K 17/36* (2013.01); *F16K 31/10* (2013.01); *F16K 11/04* (2013.01);
(Continued)

(58) Field of Classification Search
CPC ...... F16K 17/36; F16K 11/04; F16K 31/0624; F16K 31/10; Y10T 137/0318; Y10T 137/1842; G05D 23/1919; G05D 7/0635
(Continued)

(56) References Cited

U.S. PATENT DOCUMENTS 1,065,615 A * 6/1913 Lawler .................. F16K 15/025
                                                    137/100
1,559,018 A   10/1925 Taylor
(Continued)

FOREIGN PATENT DOCUMENTS

CN     101918743      12/2010
EP     0 400 395 B1   12/1990
(Continued)

OTHER PUBLICATIONS

Extended European Search Report for European Patent Application No. 14159627, dated Jun. 10, 2014, 5 pages.

*Primary Examiner* — Umashankar Venkatesan
(74) *Attorney, Agent, or Firm* — Foley & Lardner LLP

(57) ABSTRACT

A valve comprising a first flow control valve for controlling flow of a first fluid from a first source; a second flow control valve for controlling flow of a second fluid from a second source; a first actuator that controls movement of the first flow control valve; a second actuator that controls movement of the second flow control valve; and a fail-safe device that holds each of the first and second actuators in a control position in response to electric power being supplied to the valve, wherein the fail-safe device releases the first and second actuators in response to an absence of electric power being supplied to the valve such that the first actuator and the first flow control valve move toward a closed position and such that the second actuator and the second flow control valve move toward a closed position.

23 Claims, 11 Drawing Sheets

Related U.S. Application Data continuation of application No. 13/799,908, filed on Mar. 13, 2013, now Pat. No. 9,182,047.

(51) Int. Cl.
  *F16K 11/04* (2006.01)
  *F16K 31/06* (2006.01)
  *G05D 23/19* (2006.01)
  *G05D 7/06* (2006.01)

(52) U.S. Cl.
  CPC ........ *F16K 31/0624* (2013.01); *G05D 7/0635* (2013.01); *G05D 23/1919* (2013.01); *Y10T 137/0318* (2015.04); *Y10T 137/1842* (2015.04)

(58) Field of Classification Search
  USPC .............................................. 251/66, 68, 69
  See application file for complete search history.

(56) References Cited

U.S. PATENT DOCUMENTS

| | | | |
|---|---|---|---|
| 1,637,154 A | 7/1927 | Mark | |
| 1,772,443 A | 8/1930 | Eggleston | |
| 2,089,848 A | 8/1937 | Hoferle | |
| 2,126,587 A * | 8/1938 | Thornbery | F23N 5/107 136/217 |
| 2,236,227 A * | 3/1941 | Wantz | F23N 5/107 137/628 |
| 2,238,401 A | 4/1941 | Shaw | |
| 2,547,098 A | 4/1951 | Smith et al. | |
| 2,930,571 A * | 3/1960 | Vogl | F16K 31/047 251/129.12 |
| 3,420,492 A | 1/1969 | Ray | |
| RE30,135 E | 11/1979 | Fitzwater et al. | |
| 5,085,229 A | 2/1992 | Tallier et al. | |
| 5,358,177 A | 10/1994 | Cashmore | |
| 5,451,824 A | 9/1995 | Sieber et al. | |
| 6,848,474 B2 | 2/2005 | Sollier | |
| 7,007,923 B2 * | 3/2006 | Dorigo | F23N 1/005 251/129.09 |
| 8,201,803 B2 | 6/2012 | Hodnefjell et al. | |
| 9,376,792 B2 * | 6/2016 | Peel | F17D 1/00 |
| 2004/0256586 A1 | 12/2004 | Denning | |
| 2010/0282326 A1 | 11/2010 | Zhu et al. | |

FOREIGN PATENT DOCUMENTS

| | | |
|---|---|---|
| EP | 0 623 989 | 11/1994 |
| EP | 0 691 495 | 1/1996 |
| EP | 1 435 451 | 7/2004 |
| GB | 2 018 389 | 10/1979 |
| GB | 2 143 304 | 2/1985 |
| GB | 2 342 504 | 4/2000 |
| WO | WO-02/23032 | 3/2002 |
| WO | WO-2009/071902 | 6/2009 |

* cited by examiner

VALVE WITH FAIL-SAFE DEVICE

CROSS-REFERENCE TO RELATED APPLICATIONS

The present application is a Divisional of U.S. patent application Ser. No. 14/878,788, filed Oct. 8, 2015, which is a Continuation of U.S. patent application Ser. No. 13/799,908, filed Mar. 13, 2013 (now U.S. Pat. No. 9,182,047). The entire disclosures of U.S. patent application Ser. Nos. 14/878,788 and 13/799,908 are incorporated herein by reference.

BACKGROUND

The present application relates to valves for controlling flow of a fluid. More especially, the application relates to a fail safe mechanism for power operated valves. The concepts disclosed herein have particular, but not exclusive, application to valves for controlling flow of one or more fluids. The concepts disclosed herein may have application to plumbing fittings and fixtures and water supply systems and installations for washing, showering, bathing and the like that employ such plumbing fittings and fixtures.

Power operated valves are known in which a valve member is moveable relative to a valve seat between open and closed positions by means of a linear actuator for controlling fluid flow. Such valves can be left in an open position in the event of a power supply failure allowing fluid flow to continue in an uncontrolled manner until the power supply is restored. The present application is intended to address this problem.

SUMMARY

An exemplary embodiment relates to a valve for controlling fluid flow and a fail-safe device responsive to failure of a power supply to the valve, the valve including a valve member coupled to an actuator for movement towards and away from a closed position for controlling fluid flow through the valve, wherein the actuator is held in a control position by the fail-safe device for normal operation of the valve with the power supply on and is released in response to failure of the power supply for movement of the actuator and valve member towards the closed position.

Another exemplary embodiment relates to a method of operating a valve for controlling fluid flow, the method including coupling a valve member to an actuator for movement towards and away from a closed position for controlling fluid flow through the valve, holding the actuator in a control position for normal operation of the valve, and releasing the actuator in response to failure of a power supply to the valve for movement of the actuator and valve member towards the closed position.

BRIEF DESCRIPTION OF THE DRAWINGS

FIG. 2 is a sectional view of a valve and fail-safe device shown in FIG. 1 with the valve in an open position during normal operation with the power on;

FIG. 4 is a sectional view of a valve and fail-safe device according to a second embodiment with the valve in an open position during normal operation with the power on;

FIG. 6 shows the fail-safe device of FIGS. 4 and 5 in a closed state for normal operation of the valve with the power on;

FIG. 8 shows a modification to the fail safe device shown in FIGS. 6 and 7 in a closed state for normal operation of the valve with the power on;

FIG. 12 is a sectional view of a valve and fail-safe device shown in FIG. 11 with the valve in an open position during normal operation with the power on.

DETAILED DESCRIPTION

Figure 1:
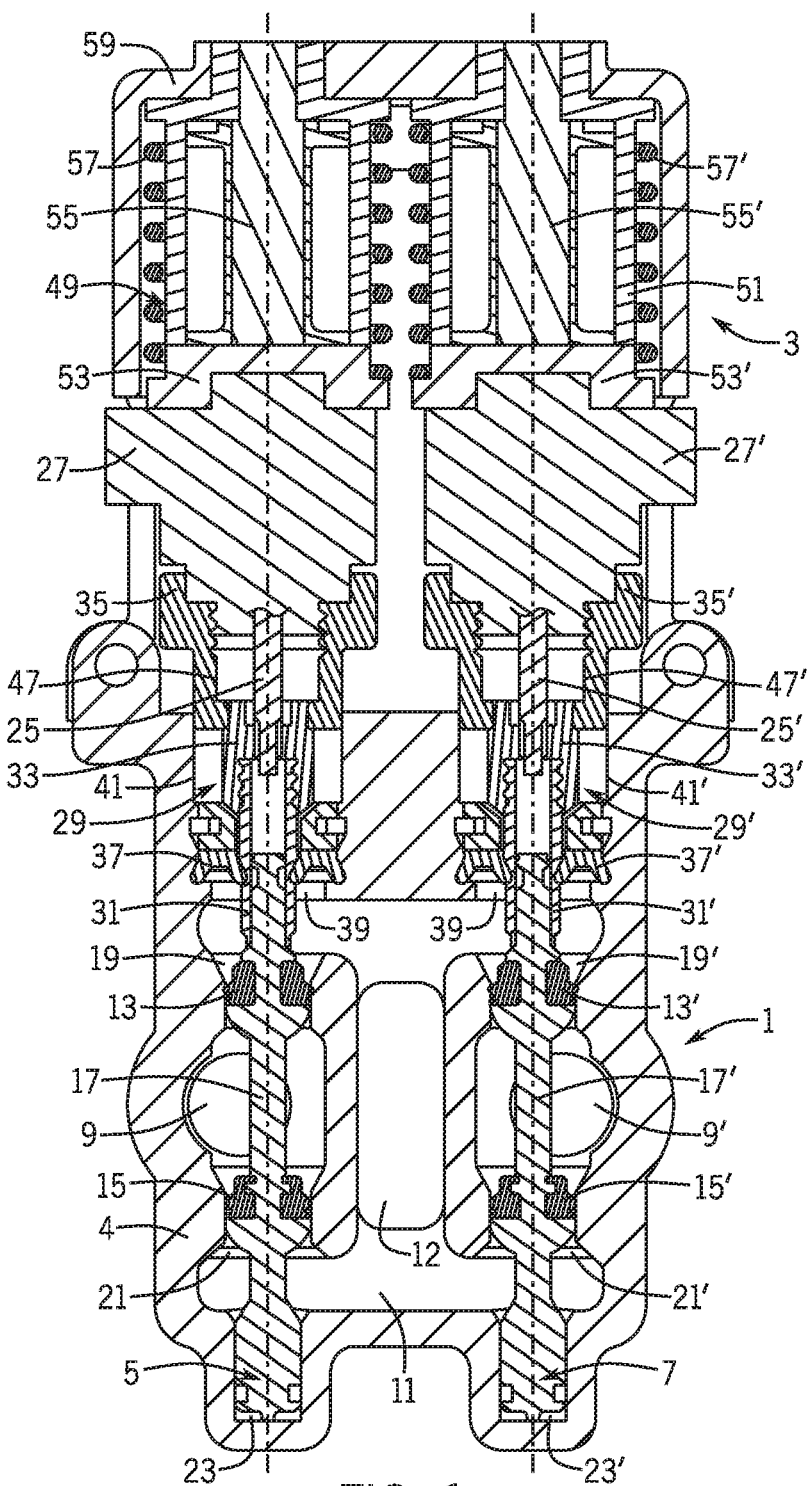
FIG. 1 is a sectional view of a valve and fail-safe device according to a first embodiment with the valve in a closed position.

An exemplary embodiment relates to a valve for controlling fluid flow and a fail-safe device responsive to failure of a power supply to the valve. The valve may have a valve member coupled to an actuator for movement towards and away from a closed position for controlling fluid flow through the valve. The actuator may be held in a control position by the fail-safe device for normal operation of the valve with the power supply on. The actuator may be released in response to failure of the power supply for movement of the actuator and valve member towards the closed position.

The actuator may be biased away from the control position. The biasing may be provided by a spring. The spring may be in an energized state when the actuator is held in the control position. Energy stored in the spring in the energized state may be employed when the actuator is released to move the actuator and valve member towards the closed position. The valve member may be moved to a safe position in response to fail-safe operation. The valve member may be moved to the closed position to shut-off fluid flow. Alternatively, the valve member may be moved to a position in which some fluid flow is permitted.

The actuator may be held in the control position by a magnetic coupling. The fail-safe device may include a latch unit configured to create a magnetic attraction force to hold the actuator in the control position. The latch unit may include an electromagnet. The actuator may be held in the control position by the electromagnet when the power supply is on and is released when the power supply is interrupted. The magnetic attraction force exceeds the biasing force to retain the actuator in the control position until the actuator is released. The magnetic attraction force may be slightly higher than the biasing force in the control position.

The actuator may be held in the control position by a mechanical coupling. The fail-safe device may include a latch unit configured to engage the actuator to hold the actuator in the control position. The latch unit may include a catch. The actuator may be held in the control position by the catch when the power supply is on and is released when the power supply is interrupted. The biasing force is stored in the control position of the actuator and is released when the actuator is released.

The valve member may remain in the safe position when power to the valve is restored following fail-safe operation until the actuator is re-set in the control position. The actuator may be a linear actuator, for example a stepper motor. The actuator may be coupled to the valve member by a coupling unit for converting rotational movement of the actuator into linear movement of the valve member towards and away from the closed position. The actuator may be operable to move relative to the valve member for re-setting the actuator in the control position.

Another exemplary embodiment relates to a method of operating a valve for controlling fluid flow. The method may include coupling a valve member to an actuator for movement towards and away from a closed position for controlling fluid flow through the valve. The method may further include holding the actuator in a control position for normal operation of the valve. The method may further include releasing the actuator in response to failure of a power supply to the valve for movement of the actuator and valve member towards the closed position.

Other features, benefits and advantages of the valve described herein will be apparent from the description hereinafter of exemplary embodiments thereof and of the application of the valve to plumbing fixtures and fittings and water supply systems and installations employing such plumbing fixtures and fittings. Such description is provided for the purpose of demonstrating the diverse ways in which the valve can be configured and used and is not intended to be limiting on the scope of the disclosure.

There now follows by way of example only a detailed description of various exemplary embodiments disclosed in the present application, with reference to the accompanying drawings.

Figure 2:
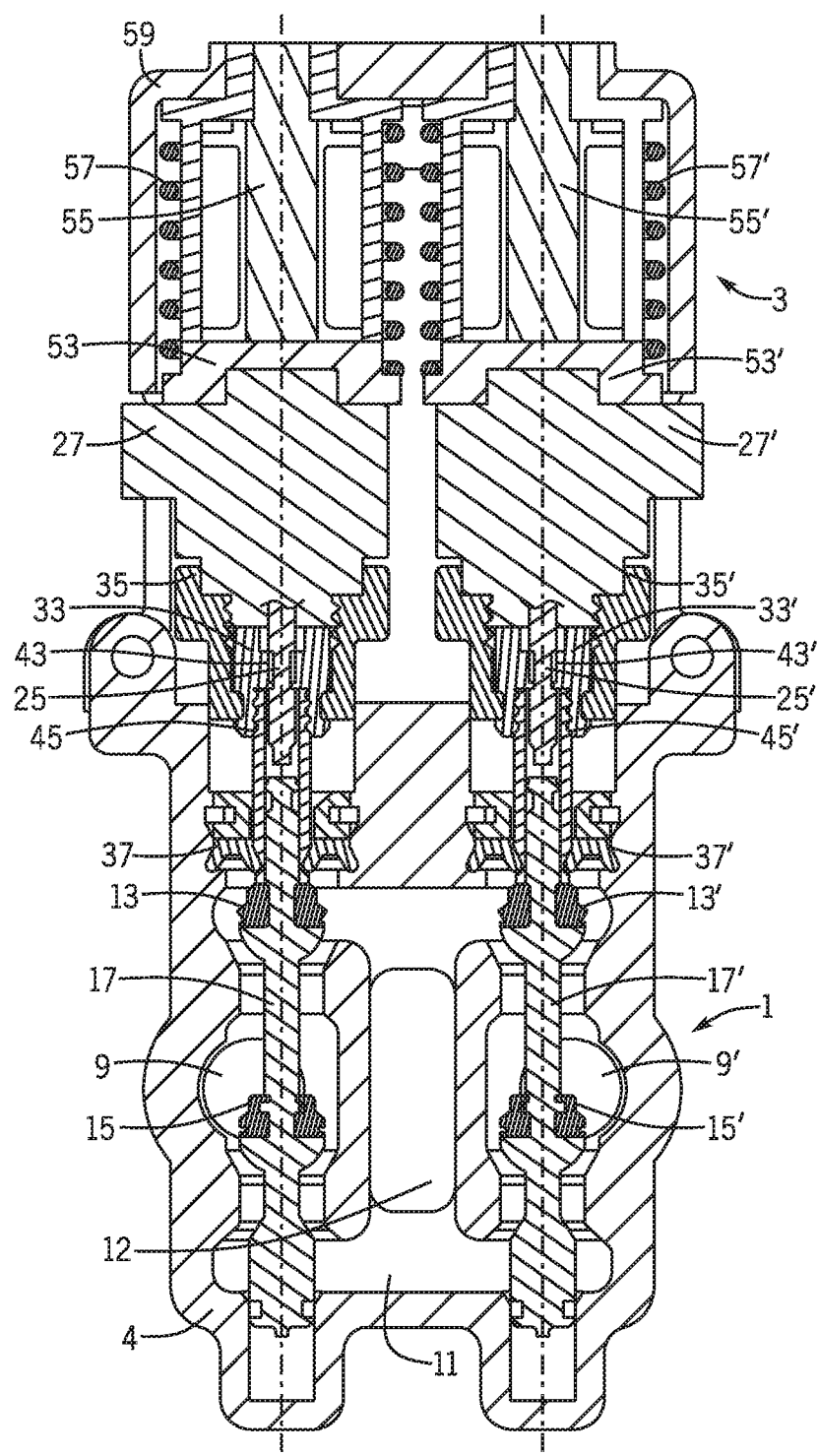
Figure 3:
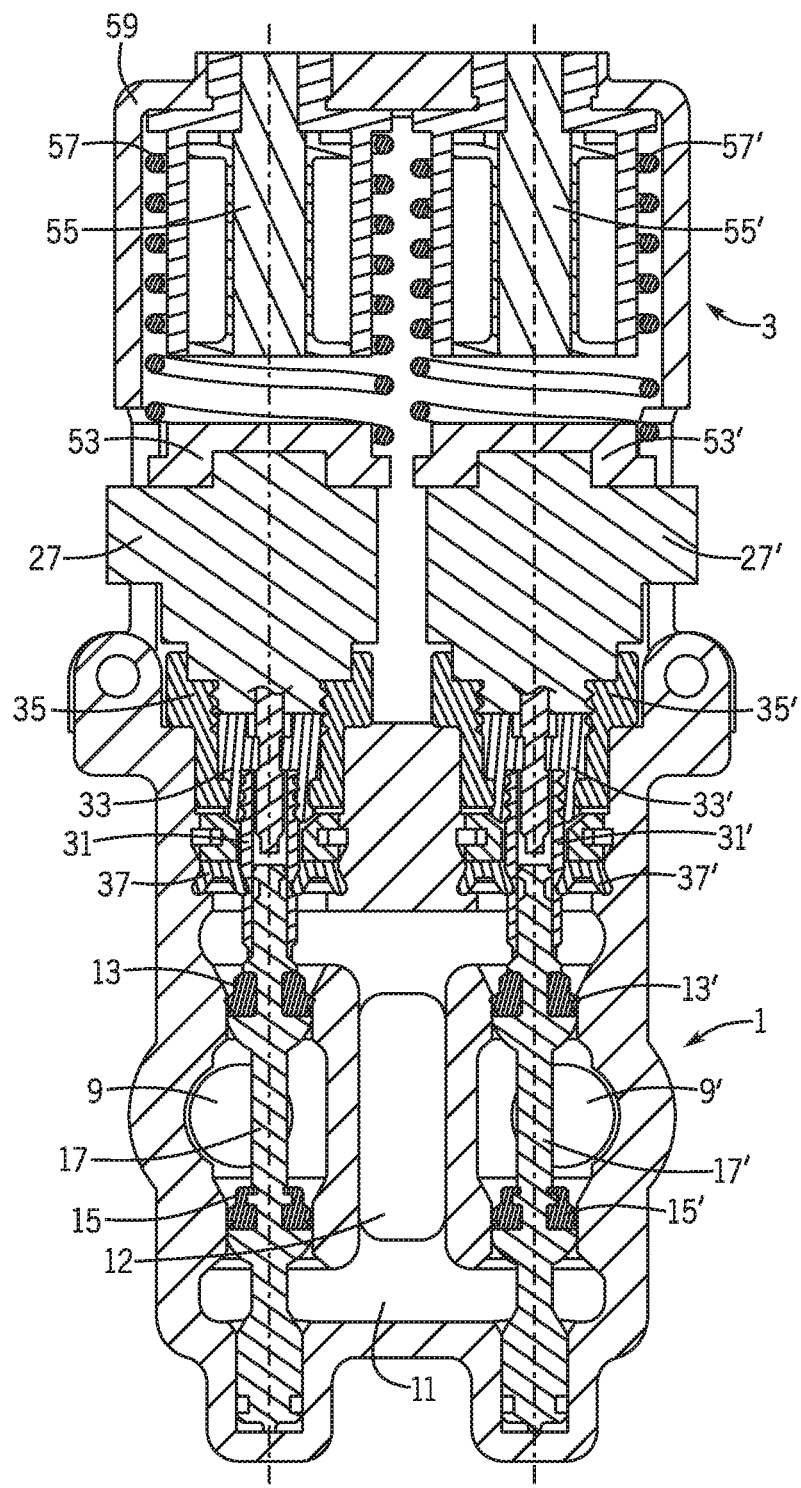
FIG. 3 is a sectional view of the valve and fail-safe device shown in FIGS. 1 and 2 with the valve in a closed position during fail-safe operation with the power off.
Figure 4:
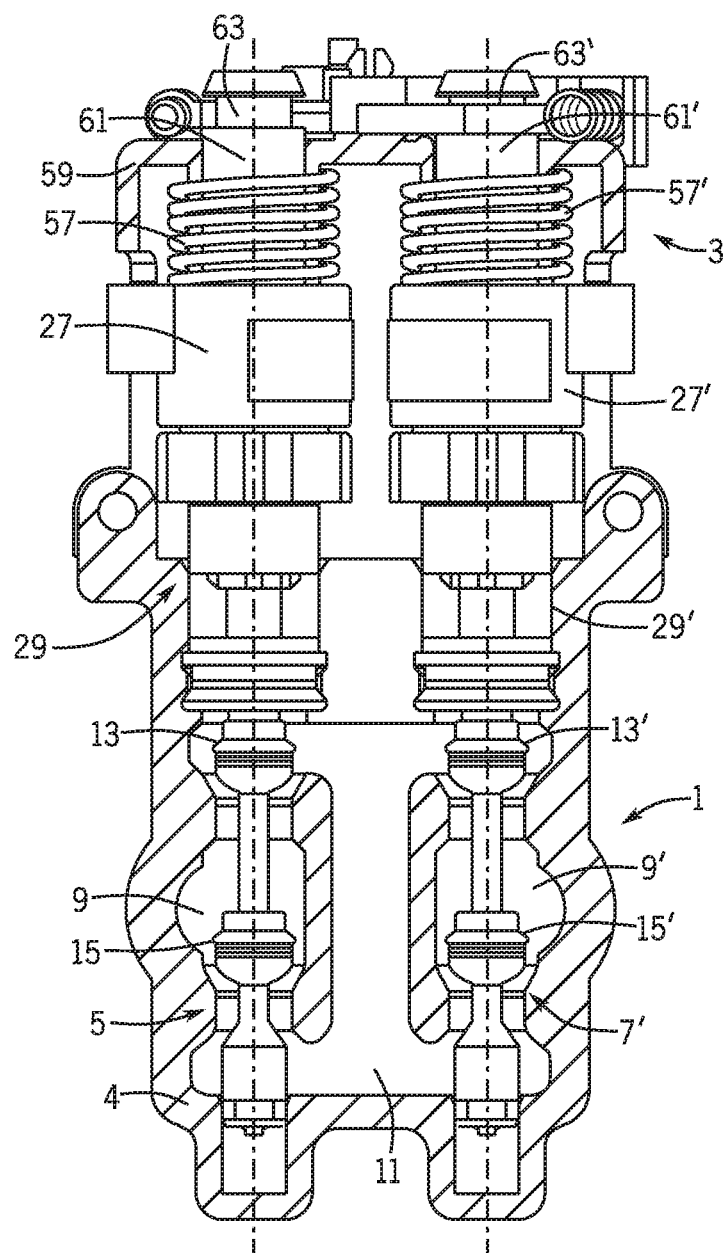
Figure 5:
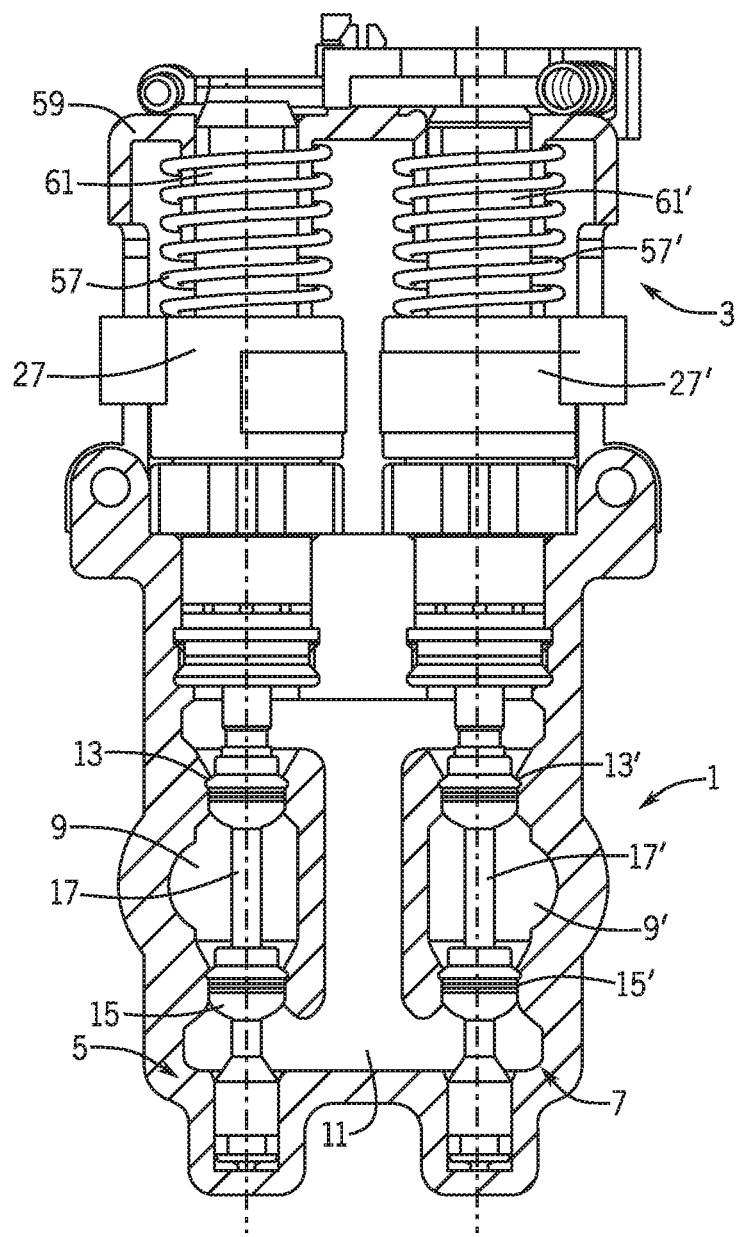
FIG. 5 is a sectional view of the valve and fail-safe device shown in FIG. 4 with the valve in a closed position during fail-safe operation with the power off.
Figure 6:
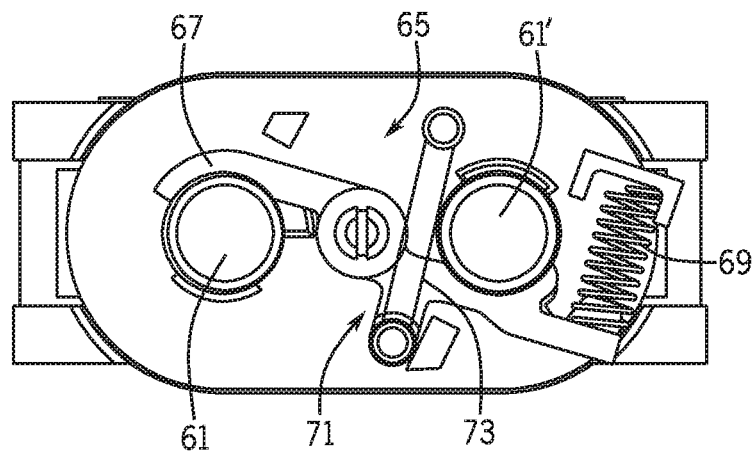
Figure 7:
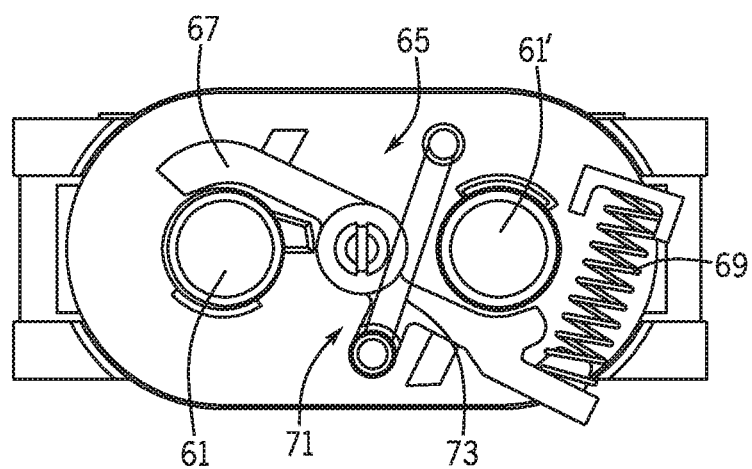
FIG. 7 shows the fail-safe device of FIG. 6 in an open state for fail-safe operation of the valve with the power off.

Referring first to FIGS. 1 to 3 of the accompanying drawings a valve 1 and fail-safe device 3 according to a first embodiment of the invention is shown. The valve 1 is described in the aforementioned United Kingdom Patent Application No. 1211101.9, filed Jun. 22, 2012, the entire disclosure of which is incorporated herein by reference. In the description that follows the valve 1 is described only insofar as necessary for an understanding of the operation of the fail-safe device 3 and the reader is directed to the disclosure of United Kingdom Patent Application No. 1211101.9, filed Jun. 22, 2012 for a more detailed description of the valve 1 and applications thereof.

The valve 1 includes a body 4 of metal, for example brass, although other materials may be used. The body 4 houses a first flow control valve 5 for a first fluid and a second flow control valve 7 for a second fluid. The first and second fluids may be water having different temperatures (nominally hot and cold water). The valve 1 provides water having a desired temperature for use. The valve 1 may provide cold water only, hot water only or a mixture of hot and cold water. The valve 1 may be incorporated in a water supply system or installation having one or more outlets for washing, showering, bathing or the like. Each outlet may include a faucet incorporating the valve 1. Alternatively, the valve 1 may be incorporated in a fitting supplying more than one outlet. For example multiple shower heads may be supplied with water from one valve 1. Other applications and uses of the valve 1 will be apparent to those skilled in the art from the description of the invention provided herein and the invention extends to and includes all modifications and changes within the spirit and scope of the disclosure.

The flow control valves 5 and 7 are similar and there follows a description of the construction and operation of the first flow control valve 5. The same reference numerals have been used but with an additional apostrophe to identify similar features of the second flow control valve 7 such that the construction and operation of the second flow control valve 7 will be apparent and understood from the description of the first flow control valve 5.

The first flow control valve 5 includes an inlet chamber 9 connected to an inlet (not shown) for a first fluid and controls flow of the first fluid from the inlet chamber 9 to a mixing chamber 11. The mixing chamber 11 provides a volume in which the first and second fluids can mix and directs the mixed fluid to an outlet 12.

The first flow control valve 5 includes first and second valve members 13, 15 fixedly mounted on a spool 17 such that they are held a predetermined distance apart. The first valve member 13 is adapted to co-operate with a first valve outlet 19 at one end of the inlet chamber 9 and the second valve member 15 is adapted to co-operate with a second valve outlet 21 at the other end of the inlet chamber 9. The first and second valve outlets 19, 21 are axially aligned and open to the mixing chamber 11. The valve members 13, 15 may be made of rubber.

A first end of the spool 17 is slidably received within a blind guide bore 23 formed in the valve body 4. A second, opposed end of the spool 17 is connected to a shaft 25 of an actuator 27 by a coupling unit 29 for converting rotational movement of the shaft 25 into linear movement of the spool 17. The actuator 27 comprises an electrically-powered motor, for example a stepper motor. Suitable stepper motors may of a type supplied by Haydon Kerk. Any actuator 27 for controlling linear movement of the spool 17 may be employed including, but not limited to, linear actuators.

The coupling unit 29 includes a tube 31 of corrosion resistant material, for example stainless steel, a drive member 33 of plastic material, and an anti-rotation member 35 also of plastics material. The tube 31 is secured at one end, for example by crimping, to the second end of the spool 17. The other end of the tube 31 is secured to the drive member 33. An annular seal member 37 of U-section provides a fluid tight seal for passage of the tube 31 through an opening 39 at one end of a bore 41 in the body 4 of the valve 1 to prevent leakage of water from the mixing chamber 11.

The drive member 33 is mounted on the shaft 25 of the actuator 27 and has an internal screw threaded portion 43 co-operable with an external screw threaded portion 45 of the shaft 25. The anti-rotation member 35 is mounted on the actuator 27 and the drive member 33 is located in an axial bore 47 of the anti-rotation member 35. The drive member 33 and bore 47 are configured to permit axial sliding movement of the drive member 33 relative to the anti-rotation member 35 while preventing rotational movement of the drive member 33 relative to the anti-rotation member 35. For example the bore 47 may be of cruciform shape and the drive member 33 provided with ribs that co-operate with the cruciform shape to prevent rotational movement of the drive member 33 while allowing axial movement. This arrangement converts rotational movement of the shaft 25 into linear movement of the drive member 35 that is transmitted to the spool 17 of the flow control valve 5 via the tube 31 for moving the valve members 13, 15 axially relative to the valve outlets between open and closed positions for controlling flow of fluid from the inlet chamber 9 to the mixing chamber 11. Any other arrangement for converting rotational movement of the shaft 25 into axial movement of the spool 17 may be employed.

The valve 1 may include a controller (not shown) which provides control signals to the actuators 27, 27' of the first and second flow control valves 5, 7. The controller may also include a temperature sensor and/or flow rate sensor to measure the temperature and/or flow rate of the water at the fluid outlet 12 of the valve 1 or at any other relevant point in the fluid flow path within the valve 1 or external thereto. The signals from the sensor(s) may be used to control the actuator 27, 27' of each flow control valve 5, 7 to control the temperature and/or flow rate of the water leaving the outlet 12. For example the signals may be used to maintain a desired temperature and/or flow rate or to provide feedback to the controller so that the water leaving the outlet 12 corresponds to desired settings despite changes in the water pressure and temperature at the first fluid inlet and/or second fluid inlet. The controller may include an interface to receive settings input by a user. Wired or wireless communication may be provided between the controller, sensor(s) and interface.

The fail-safe device 3 is arranged to shut-off fluid flow in the event of a power supply failure occurring while one or both flow control valves 5, 7 is in an open position. The fail-safe device 3 includes a latch unit 49 for the actuator 27 of the first flow control valve 5 and a latch unit 51 for the actuator 27' of the second flow control valve 7. The latch units 49, 51 are arranged to hold the actuators 27, 27' in a control position for normal operation of the valve 1 shown in FIGS. 1 and 2 when the power supply to drive the actuators 27, 27' is on and to release the actuators 27, 27' for movement to close the flow control valves 5, 7 during fail-safe operation of the valve 1 shown in FIG. 3 if the power supply to drive the actuators 27, 27' is interrupted when one or both of the flow control valves 5, 7 is open.

The latch units 49, 51 are similar and there follows a description of the construction and operation of the latch unit 49 for the first flow control valve 5. The same reference numerals have been used but with an additional apostrophe to identify similar features of the latch unit 51 for the second flow control valve 7 such that the construction and operation of the latch unit 51 for the second flow control valve 7 will be apparent and understood from the description of the latch unit 49 for first flow control valve 5.

The latch unit 49 includes an armature 53 of magnetic material such as steel that is fixed to the actuator 27 of the first flow control valve 5 and an electromagnet 55. The electromagnet 55 is connected to the power supply for the actuator 27 and the magnetic attraction force between the armature 53 and the electromagnet 55 is chosen to couple the armature 53 to the electromagnet 55 to hold the actuator 27 in the control position against the biasing of a compression spring 57 acting between the armature 53 and the electromagnet 55 when the power supply to drive the actuator 27 is on.

In the control position, the actuator 27 is operable to move the spool 17 between the closed position of the first flow control valve 5 shown in FIG. 1 and the full open position of the first flow control valve 5 shown in FIG. 2 for controlling flow of the first fluid from the inlet chamber 9 to the mixing chamber 11. The actuator 27 can move the spool 17 to position the first flow control valve 5 at any intermediate position between the closed and full open positions for varying the flow of the first fluid. Flow of the second fluid can be varied in similar manner such that the relative proportions of the first and second fluids admitted to the mixing chamber 11 can be adjusted to provide mixed fluid at the outlet 12 which in the case of the first and second fluids being water having different temperatures can produce mixed water having any desired intermediate temperature for the intended use such as washing, showering or bathing.

In the event of a power failure occurring when the first flow control valve 5 is in an open position, such as the full open position shown in FIG. 2, the magnetic attraction force between the armature 53 and the electromagnet 55 is lost and the energy stored in the spring 57 is released creating a biasing force acting on the armature 53 to move the actuator 27 away from the control position and thus move the spool 17 to close the first flow control valve 5 as shown in FIG. 3. The second flow control valve 7 is closed in similar manner if the power is interrupted when this valve 7 is in an open position.

If the power is re-instated after fail-safe operation of the valve 1, the magnetic attraction force between the electromagnets 55, 55' and armatures 53, 53' of the actuators 27, 27' is insufficient to overcome the biasing force of the springs 57, 57' acting on the actuators 27, 27' and the flow control valves 5, 7 remain closed until the valve 1 is re-set.

In order to re-set the valve 1 following a power failure/interruption, the actuators 27, 27' are operated to rotate the shafts 25, 25' in a direction to return the actuators 27, 27' to the control position without moving the spools 17, 17' so that the flow control valves 5, 7 remain closed. The actuators 27, 27' are guided for movement to and from the control position by engagement of the anti-rotation members 35, 35' in the bores 41, 41' in the body 4. The latch units 49, 51 and actuators 27, 27' are located within a housing 59 connected to the body 4 of the valve 1.

Once the actuators 27, 27' have returned to the control position in FIG. 1 with the flow control valves 5, 7 closed, the actuators 27, 27' can again be operated to control movement of the spools 17, 17' as described previously for controlling flow of the first and second fluids during normal operation of the valve 1.

As will be understood, the above-described fail-safe operation occurs whenever there is a power failure/interruption with one or both flow control valves 5, 7 in an open position. If the flow control valves 5, 7 are returned to the closed position shown in FIG. 1 during normal operation and the power fails or is interrupted in this position, the actuators 27, 27' remain in the control position even though the magnetic attraction force between the electromagnets 55, 55' and the armatures 53, 53' has been lost because the spools 17, 17' are seated at the end of the blind bores 23, 23' in the valve body 4. As a result, the armatures 53, 53' are re-coupled to the electromagnets 55, 55' when power is restored allowing normal operation of the valve 1.

In a modification (not shown), the electromagnets 55, 55' may be replaced by a single electromagnet to which both armatures 53, 53' may be coupled for holding the actuators 27, 27' in the control position. In another modification (not shown), the compression springs 57 may be replaced by tension springs arranged so that, when the actuators 27, 27' are released, the actuators 27, 27' and spools 17, 17' are moved to close the valve 1 by the energy stored in the springs when the actuators 27, 27' are held in the control position.

Referring now to FIGS. 4 to 7, an alternative fail-safe device 3 is shown in which the magnetic coupling provided by the latch units 49, 51 to hold the actuators 27, 27' in the control position against the biasing of the springs 57, 57' for normal operation of the valve 1 is replaced by a mechanical coupling. Like reference numerals are used to indicate parts of the valve 1 corresponding to the previous embodiment.

In this embodiment, the actuators 27, 27' have axial extensions 61, 61' that project through openings in the housing 59 and are provided with an annular groove 63, 63'.

The fail-safe device 3 includes a latch unit 65 for both actuators 27, 27'. The latch unit 65 includes a catch plate 67 mounted for rotation about an axis intermediate the ends. The catch plate 67 engages the grooves 63, 63' on opposite sides of the rotational axis to hold the actuators 27, 27' in the control position against the biasing of compression springs 57, 57' that surround the extensions 61, 61' and act between the housing 59 and the actuators 27, 27'.

The catch plate 67 is biased by a spring 69 in a direction to disengage the grooves 63, 63' and is retained in the engaged position by an actuator 71 responsive to failure/interruption of the power supply to the actuators 27, 27'. In this embodiment, the actuator 71 is provided by a shape memory alloy (SMA) wire loop 73 that extends between the catch plate 67 and the housing 59.

The SMA wire loop 73 is connected to the power supply to the actuators 27, 27' and contracts when the power is on to oppose the biasing of the spring 69 and maintain the engagement between the catch plate 67 and the grooves 63, 63' in the axial extensions 61, 61' of the actuators 27, 27' to hold the actuators 27, 27' in the control position for normal operation of the valve 1 as described previously for the embodiment of FIGS. 1 to 3.

In the event of failure or interruption of the power supply with one or both flow control valves 5, 7 in an open position, the SMA wire loop 73 extends allowing the catch plate 67 to rotate under the biasing of the spring 69 to disengage the grooves 63, 63' in the axial extensions 61, 61' of the actuators 27, 27' thereby releasing the actuators 27, 27' to move under the biasing of springs 57, 57' to close the flow control valves 5, 7 as described previously for the embodiment of FIGS. 1 to 3.

When re-setting the valve 1 following fail-safe operation to shut-off flow, the shafts 25, 25' of the actuators 27, 27' are rotated in a direction to return the actuators 27, 27' to the control position without opening the flow control valves 5, 7. This may be done before power is re-instated to the latch unit 65 to allow the catch plate 67 to re-engage the grooves 61, 61' when power is restored and the SMA wire loop 73 contracts to rotate the catch plate 67 against the biasing of the spring 69. Alternatively, end faces of the axial extensions 61, 61' may be chamfered to co-operate with and displace the catch plate 67 sufficiently to allow the catch plate 67 to re-engage the grooves 63, 63'.

Figure 8:
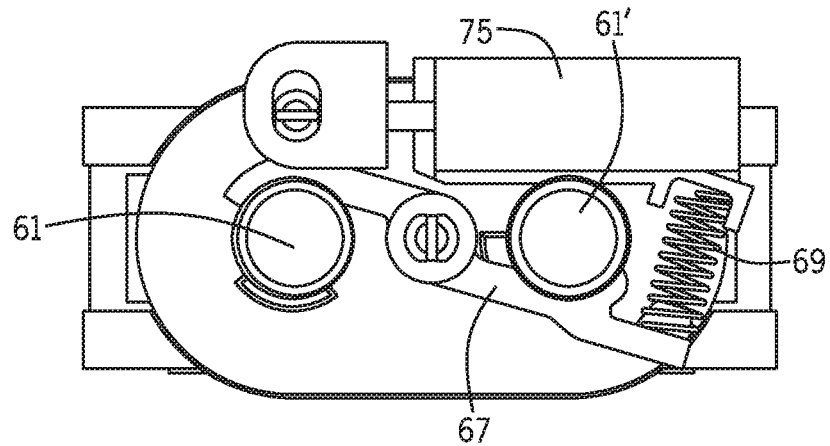
Figure 9:
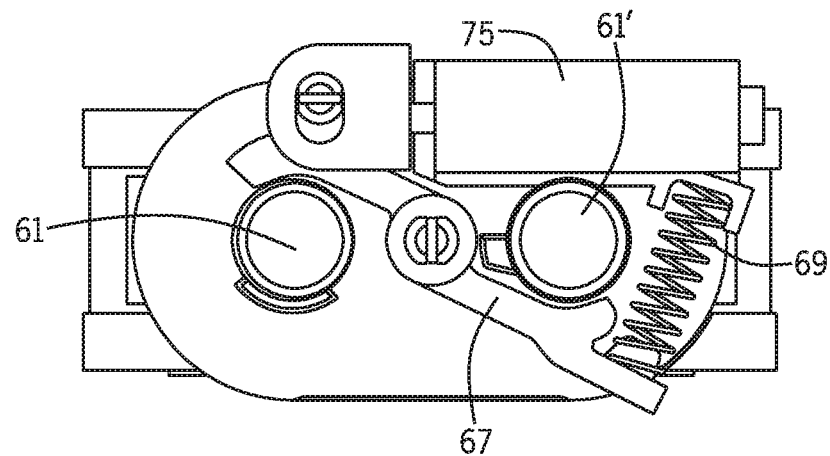
FIG. 9 shows the fail-safe device of FIG. 8 in an open state for fail-safe operation of the valve with the power off.

Referring now to FIGS. 8 and 9, a modification to the fail-safe device 3 of FIGS. 4 to 7 is shown in which a solenoid actuator 75 is provided in place of the SMA wire loop 73. In this embodiment, the solenoid actuator 75 is connected to the power supply to the actuators 27, 27' and maintains the engagement of the catch plate 67 with the grooves 63, 63' in the axial extensions of the actuators 27, 27' when the power is on. In the event of failure or interruption of the power supply, the solenoid actuator 75 no longer opposes the biasing of the spring 69 and the catch plate 67 is able to rotate to disengage the grooves 63, 63' and allow the actuators 27, 27' to move under the biasing of the springs 57, 57' to close the flow control valves 5, 7 as described previously for the embodiment of FIGS. 1 to 3.

In other respects the operation of this modified embodiment is similar to the embodiment of FIGS. 4 to 7 and will be understood from the description of FIGS. 4 to 7. Like reference numerals are used to indicate similar parts.

Figure 10:
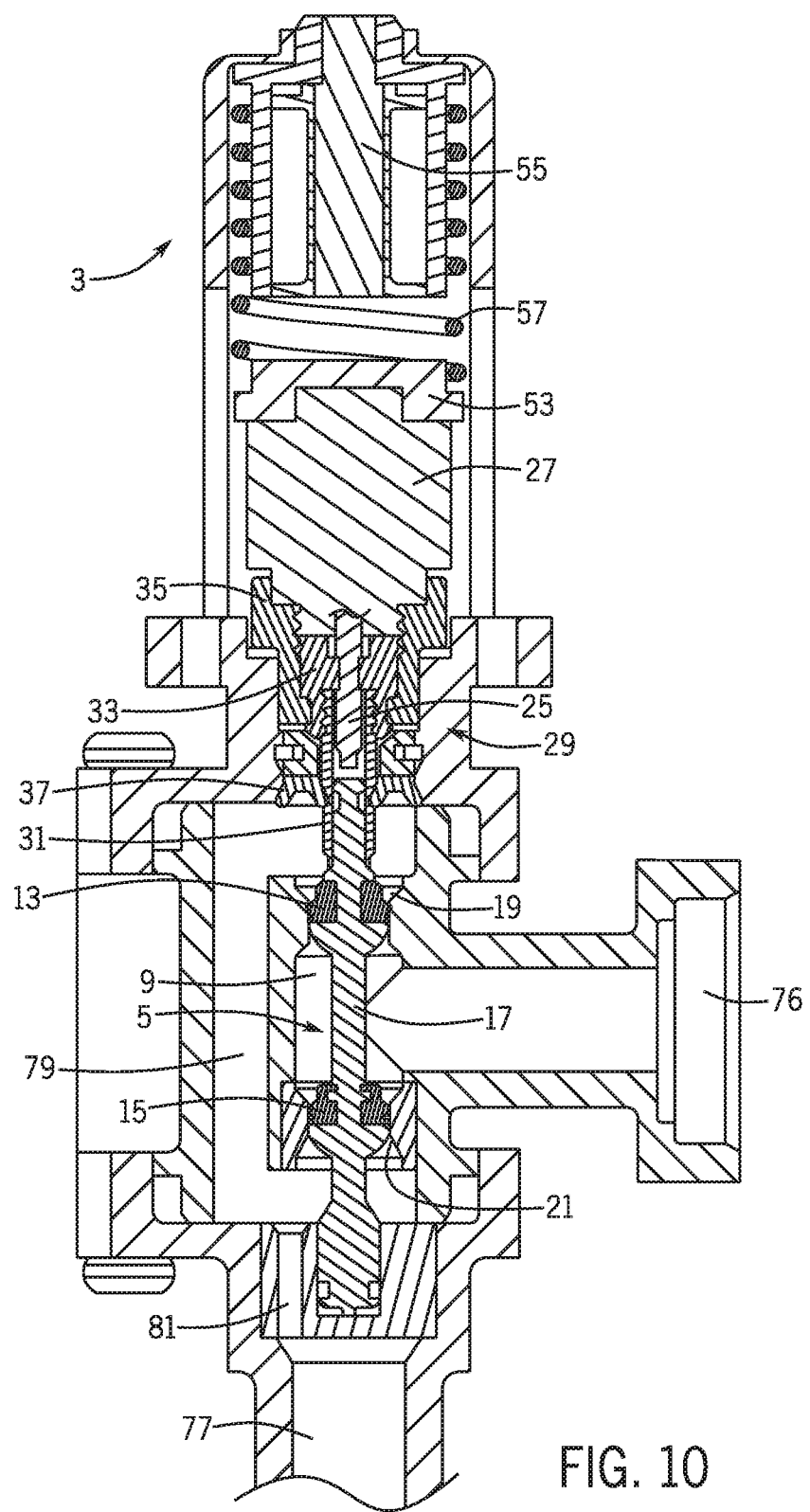
FIG. 10 is a sectional view of a valve and fail-device according to a third embodiment with the valve in a closed position during fail-safe operation with the power off.

Referring now to FIG. 10, there is shown an embodiment having a single flow control valve and fail-safe device suitable for applications in which it is desirable to control fluid flow. One such application is in an instantaneous water heater of the type commonly used in electric showers to provide a source of hot water on demand.

FIG. 10 shows the flow control valve 5 and fail safe device 3 from the embodiment of FIGS. 1 to 3 arranged to control flow of a water supply, typically cold water, to a heat exchanger tank (not shown) of an instantaneous water heater. The control valve 5 has an inlet 76 connected to the water supply and an outlet 77 connected to the heat exchanger tank. The inlet 76 opens to the inlet chamber 9 of the flow control valve 5 and the valve outlets 19, 21 open to an outlet chamber 79 leading to the outlet 77 through one or more ports 81.

In this type of water heater, the incoming supply of water is heated as it flows through the heat exchanger tank by one or more electric heating elements. The outlet water temperature from the heat exchanger tank is dependent on the flow rate of the water and the power input to the heater tank. The power input can often be selected by varying the number and power rating of the heating elements such that, for a given power input, the outlet water temperature can be controlled by varying the flow rate.

In this application, if the power supply to the heat exchanger tank fails or is interrupted while the flow control valve 5 is open, the fail safe device 3 is operable to close the valve 5 and shut-off the flow. FIG. 10 shows the flow control valve 5 in the closed position following fail-safe operation. A time delay may be provided before shutting-off the flow to allow the heat exchanger tank to be flushed with cold water to reduce the temperature of the heating elements and prevent any water remaining in the heat exchanger tank being heated to an elevated temperature which may give rise a risk of scalding if the power is restored and the water heater turned on again soon after fail-safe operation.

In other respects the construction and operation of the flow control valve 5 and the fail-safe device 3 will be understood from the description of FIGS. 1 to 3 and like reference numerals are used to indicate similar parts. It will be understood that the flow control valve could be replaced by any of the flow control valves shown in FIGS. 4 to 9.

Another application where a single flow control valve and fail-safe device might be provided is to control the flow of water from a mixing valve. Other applications will be apparent to those skilled in the art.

In the above-described embodiments the or each flow control valve 5, 7 is of the type disclosed in United Kingdom Patent Application No. 1211101.9, filed Jun. 22, 2012, in which the valve spool 17 is provided with two valve members 13, 15 for controlling fluid flow through the valve 1. It will be understood, however, that this is not essential and that the concepts described herein have wider application to provide fail-safe operation of any valve having at least one valve member movable towards and away from a closed position by means of an actuator for controlling flow through the valve.

Figure 11:
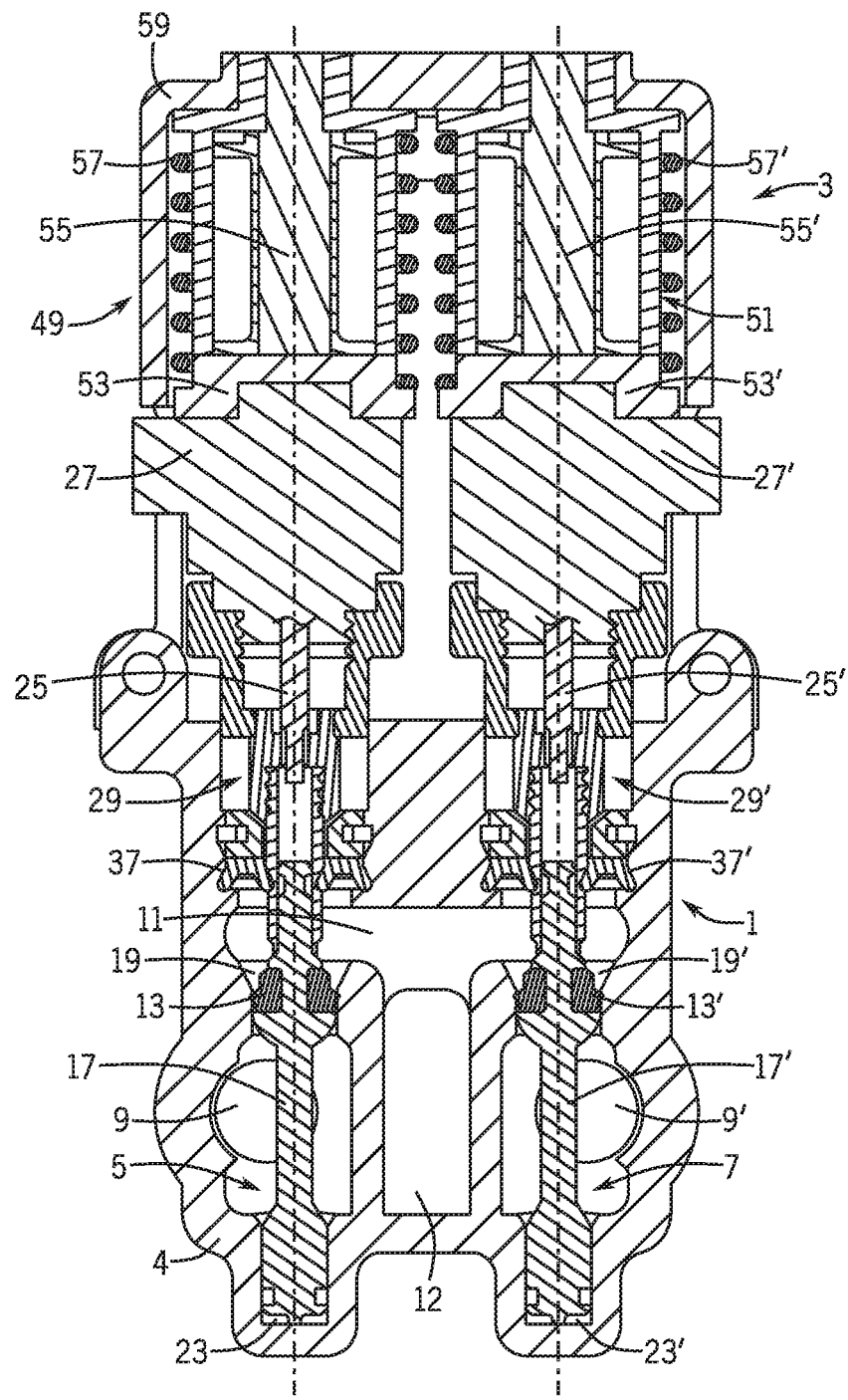
FIG. 11 is a sectional view of a valve and fail-safe device according to a fourth embodiment with the valve in a closed position.
Figure 12:
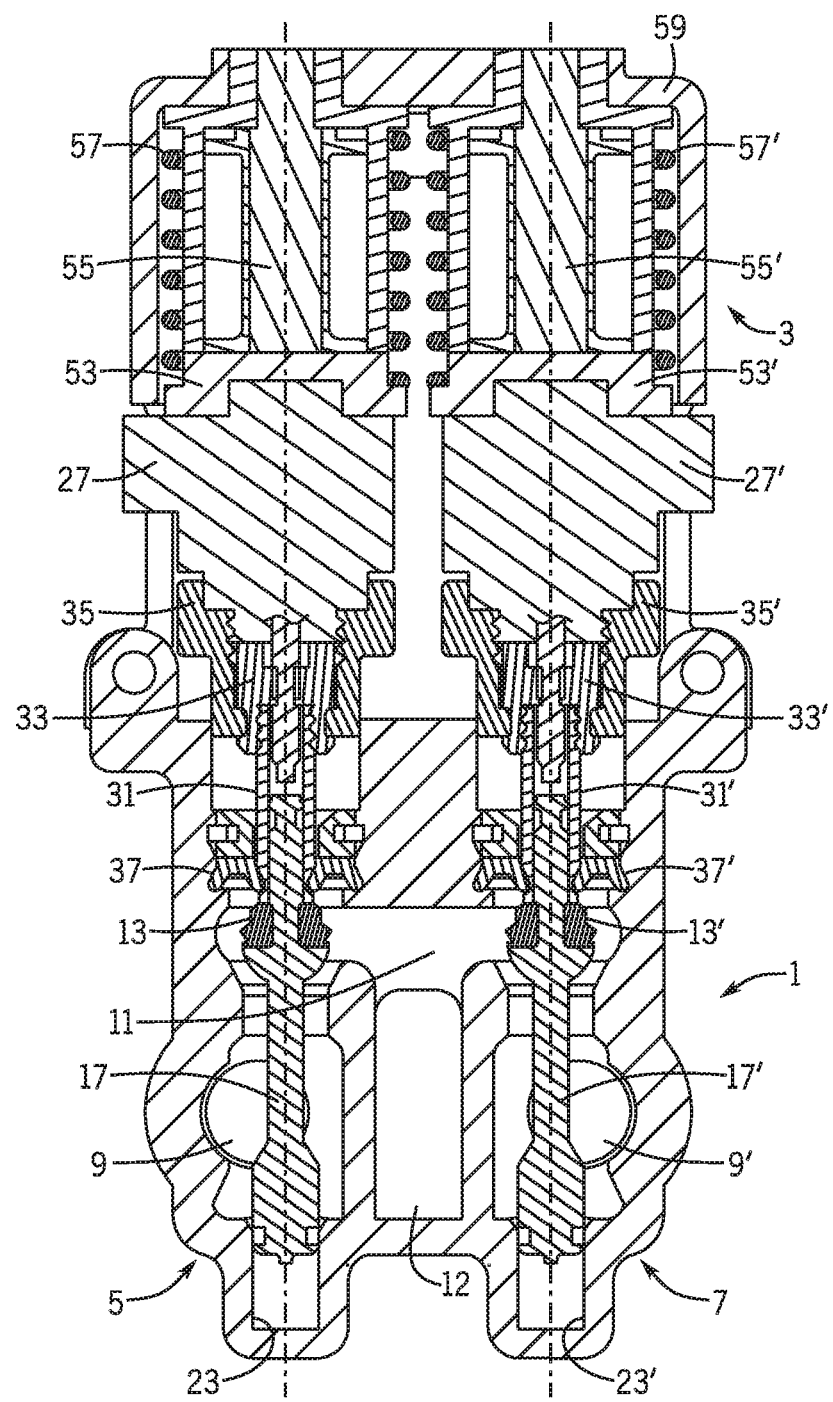
Figure 13:
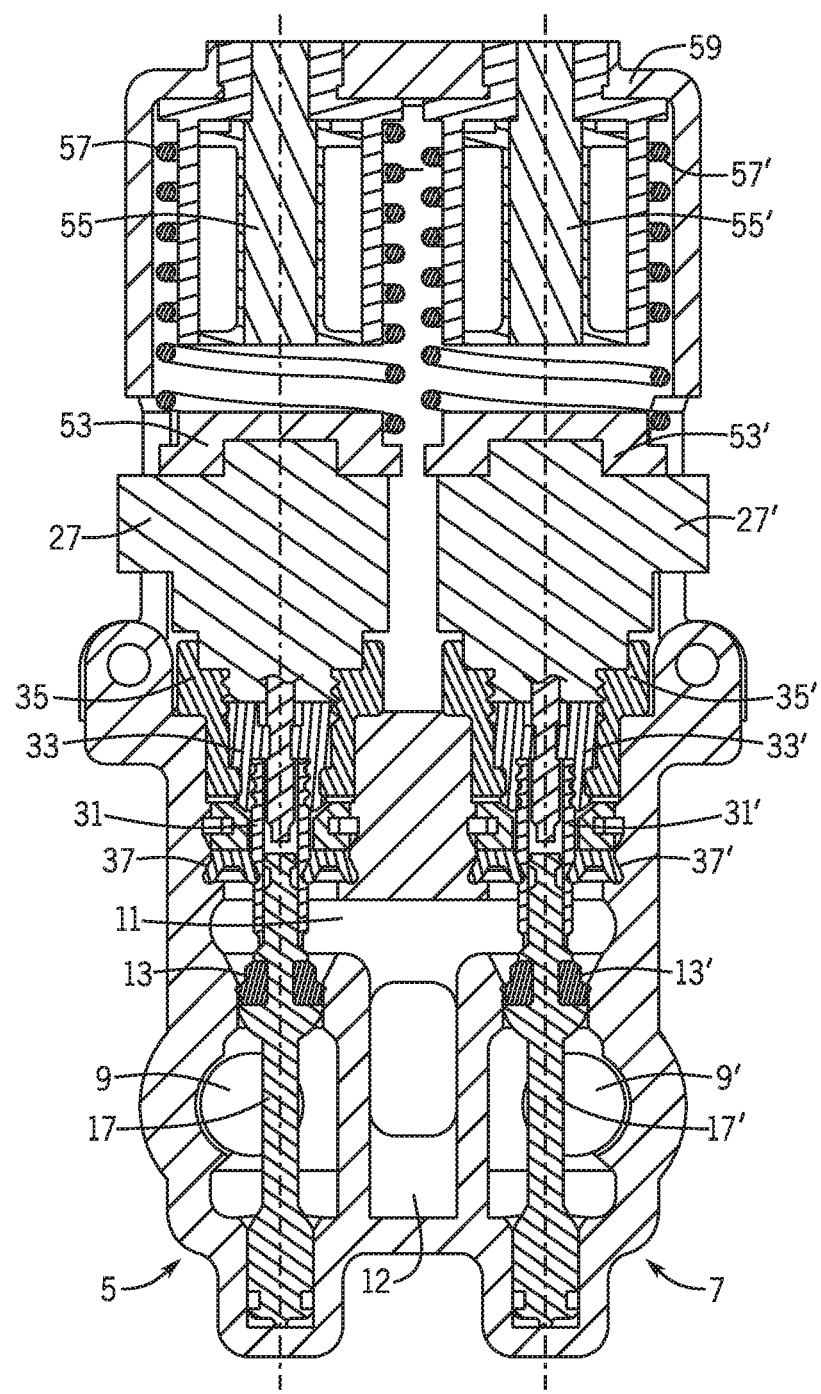
FIG. 13 is a sectional view of the valve and fail-safe device shown in FIGS. 11 and 12 with the valve in a closed position during fail-safe operation with the power off.

Referring now to FIGS. 11 to 13, a modification of the valve shown in FIGS. 1 to 3 is shown in which like reference numerals are used to indicate corresponding parts. In this modification, the inlet chambers 9, 9' of the flow control valves 5, 7 open to the mixing chamber 11 through a single valve outlet 19, 19' and the valve spools 17, 17' are provided with a single valve member 13, 13' for controlling flow through the valve outlet 19, 19'. In other respects the construction and operation of the valve 1 and fail-safe device 3 is similar to and will be understood from the description of FIGS. 1 to 3. A similar modification may be made to the valve shown in FIG. 10 in which a single flow control valve is provided.

The fail-safe device 3 shown in FIGS. 11 to 13 employs latch units 49, 51 that provide a magnetic coupling to hold the actuators 27, 27' in the control position. It will be understood however that the latch units 49, 51 may be replaced by any of the latch units described herein such as the latch units shown in FIGS. 4 to 9 that provide a mechanical coupling to hold the actuators 27, 27' in the control position.

By employing movement of the actuator to close the valve during fail-safe operation, no components of the fail-safe device are present in the fluid flow path. In particular, the spring biasing the actuator is located outside the flow path and is therefore dry and does not provide a surface area for microbial growth within the fluid flow path. In addition, where a magnetic coupling is employed to hold the actuator in the control position, the electromagnetic element is stationary enabling easier connection to the power supply.

Although the exemplary embodiments describe arrangements in which one or more flow control valves of the type described in United Kingdom Patent Application No. 1211101.9, filed Jun. 22, 2012 is/are provided with a fail-safe device, it will be understood that the fail-safe devices described herein have wider application and could be employed with any electrically powered valve to shut-off flow in the event of failure or interruption of the power supply to the valve. Moreover, while it may generally be desirable to shut-off the flow completely in the event of failure or interruption of the power supply to the valve to prevent waste from uncontrolled flow of fluid (water) through the valve, there may be applications where it may be desirable to allow some flow of fluid (water) to continue. Thus, it may be that the fail-safe device is arranged to control flow to provide a pre-determined flow rather than to shut-off the flow completely. Such pre-determined flow might be required in some applications for safety reasons.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the valves and related assemblies as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the inventions described herein. Other modifications that can be made will be apparent to those skilled in the art and the invention extends to and includes all such modifications. Any of the features described herein may be employed separately or in combination with any other feature and the invention extends to and includes any such feature or combination of features whether or not described herein.

What is claimed is:

1. A valve comprising:
   a housing;
   a first flow control valve for controlling flow of a first fluid from a first source;
   a second flow control valve for controlling flow of a second fluid from a second source;
   a first actuator that is configured to move the first flow control valve;
   a second actuator that is configured to move the second flow control valve;
   a fail-safe device that holds each of the first and second actuators in a control position in response to electric power being supplied to the valve, wherein the fail-safe device releases the first and second actuators in response to an absence of electric power being supplied to the valve such that the first actuator and the first flow control valve move toward a closed position and such that the second actuator and the second flow control valve move toward a closed position;
   a first spring that is disposed between the first actuator and the housing and is configured to apply a biasing force that biases the first actuator away from the housing; and
   a second spring that is disposed between the second actuator and the housing and is configured to apply a biasing force that biases the second actuator away from the housing.

2. The valve of claim 1, wherein each of the first and second actuators comprises a motor, and wherein the motor and associated flow control valve are moved together toward the closed position by a spring in response to the absence of electric power being supplied to the valve.

3. The valve of claim 2, further comprising a housing, wherein each spring is located between the housing and the motor of the associated actuator.

4. The valve of claim 3, wherein each spring is located between an armature and an electromagnet associated with one actuator and the associated flow control valve.

5. The valve of claim 4, wherein each electromagnet is fixedly coupled to the housing and each armature is fixedly coupled to the associated motor, such that the armature and motor move together away from the associated electromagnet in response to the absence of electric power being supplied to the valve.

6. The valve of claim 1, wherein each of the first and second flow control valves comprises a spool and first and second valve members fixedly mounted on the spool at a predetermined distance apart; and wherein a first end of the spool is slidably received within a blind guide bore formed in a valve body, and a second, opposed end of the spool is connected to the associated actuator.

7. The valve of claim 6, wherein the second end of each spool is connected to a shaft of the associated actuator through a coupling unit that converts rotational movement of the shaft into linear movement of the spool.

8. The valve of claim 1, further comprising the power supply, wherein the first actuator is electrically coupled to the power supply and the second actuator is electrically coupled to the power supply.

9. The valve of claim 1, further comprising:
a first armature coupled to the first actuator such that the first armature and the first actuator move together between the control and closed positions; and
a second armature coupled to the second actuator such that the second armature and the second actuator move together between the control and closed positions.

10. The valve of claim 9, further comprising:
a first electromagnet that is configured to move the first armature and the first actuator toward the control position with a magnetic force in response to electric power being supplied to the valve; and
a second electromagnet that is configured to move the second armature and the second actuator toward the control position with a magnetic force in response to electric power being supplied to the valve;
wherein the magnetic forces from the first and second electromagnets are discontinued in response to the absence of electric power being supplied to the valve.

11. The valve of claim 10, wherein the first electromagnet is fixed relative to the housing, the second electromagnet is fixed relative to the housing, the entire first armature and the entire first actuator move together relative to the housing by a first distance between the control and closed positions, and the entire second armature and the entire second actuator move together relative to the housing by a second distance between the control and closed positions.

12. A valve comprising:
a housing;
a first flow control valve for controlling flow of a first fluid from a first source;
a second flow control valve for controlling flow of a second fluid from a second source;
a first actuator that controls movement of the first flow control valve;
a second actuator that controls movement of the second flow control valve;
a fail-safe device that holds each of the first and second actuators in a control position in response to electric power being supplied to the valve, wherein the fail-safe device releases the first and second actuators in response to an absence of electric power being supplied to the valve such that the first actuator and the first flow control valve move toward a closed position and such that the second actuator and the second flow control valve move toward a closed position;
a first armature coupled to the first actuator such that the entire first armature and the entire first actuator move together relative to the housing by a first distance between the control and closed positions; and
a second armature coupled to the second actuator such that the entire second armature and the entire second actuator move together relative to the housing by a second distance between the control and closed positions.

13. The valve of claim 12, further comprising:
a first electromagnet that is fixed relative to the housing and is configured to move the first armature toward the control position with a magnetic force in response to electric power being supplied to the valve; and
a second electromagnet that is fixed relative to the housing and is configured to move the second armature toward the control position with a magnetic force in response to electric power being supplied to the valve;
wherein the magnetic forces from the first and second electromagnets are discontinued in response to the absence of electric power being supplied to the valve.

14. The valve of claim 13, further comprising:
a first spring that is disposed between the first armature and the housing and is configured to apply a biasing force that biases the first armature away from the first electromagnet, wherein the magnetic force from the first electromagnet is stronger than the biasing force of first spring when electric power is supplied to the valve; and
a second spring that is disposed between the second armature and the housing and is configured to apply a biasing force that biases the second armature away from the second electromagnet, wherein the magnetic force from the second electromagnet is stronger than the biasing force of second spring when electric power is supplied to the valve.

15. The valve of claim 14, further comprising the power supply, wherein the first actuator is electrically coupled to the power supply and the second actuator is electrically coupled to the power supply.

16. The valve of claim 14, wherein each spring of the first and second springs is a helical spring wrapping around the associated electromagnet and extending between a first end that acts against a first portion of the housing and a second end that acts against the associated armature.

17. The valve of claim 16, wherein the first and second springs are located within the housing.

18. The valve of claim 12, wherein the first actuator and the first armature are fixedly coupled together, such that the first actuator and the first armature move the same distance between the control position and the closed position; and wherein the second actuator and the second armature are fixedly coupled together, such that the second actuator and the second armature move the same distance between the control position and the closed position.

19. A valve comprising:
a first flow control valve for controlling flow of a first fluid from a first source;
a second flow control valve for controlling flow of a second fluid from a second source;
a first actuator that controls movement of the first flow control valve;
a second actuator that controls movement of the second flow control valve; and
a fail-safe device that holds each of the first and second actuators in a control position in response to electric power being supplied to the valve, wherein the fail-safe device releases the first and second actuators in response to an absence of electric power being supplied to the valve such that the first actuator and the first flow control valve move toward a closed position and such that the second actuator and the second flow control valve move toward a closed position wherein each of the first and second flow control valves comprises a spool and first and second valve members fixedly mounted on the spool at a predetermined distance apart;

wherein a first end of the spool is slidably received within a blind guide bore formed in a valve body, and a second, opposed end of the spool is connected to the associated actuator; and wherein the second end of each spool is connected to a shaft of the associated actuator through a coupling unit that converts rotational movement of the shaft into linear movement of the spool.

20. The valve of claim 19, further comprising a latch unit associated with each of the first and second actuators, wherein each latch unit comprises a catch plate that engages a groove in an engaged position to hold the associated actuator in the control position.

21. The valve of claim 20, wherein each groove is circumferentially disposed in an extension of the associated actuator.

22. The valve of claim 20, wherein the catch plate is biased by a spring in a direction to disengage the groove.

23. The valve of claim 20, wherein the latch unit comprises a wire loop configured to retain the catch plate in the engaged position, wherein the wire loop comprises a shape memory alloy.

* * * * *